(12) United States Patent
Boock

(10) Patent No.: US 8,100,148 B2
(45) Date of Patent: Jan. 24, 2012

(54) HYDRO SOUND DAMPER, IN PARTICULAR FOR INTEGRATION IN AN AIRCRAFT HYDRAULIC SYSTEM

(75) Inventor: Klaus Boock, Timmdorf (DE)

(73) Assignee: Airbus Operations GmbH, Hamburg (DE)

(*) Notice: Subject to any disclaimer, the term of this patent is extended or adjusted under 35 U.S.C. 154(b) by 343 days.

(21) Appl. No.: 12/399,644

(22) Filed: Mar. 6, 2009

(65) Prior Publication Data

US 2009/0236002 A1 Sep. 24, 2009

Related U.S. Application Data

(60) Provisional application No. 61/070,076, filed on Mar. 20, 2008.

(51) Int. Cl.
*F16L 55/04* (2006.01)
(52) U.S. Cl. .......................................................... 138/30
(58) Field of Classification Search ................ 138/30
See application file for complete search history.

(56) References Cited

U.S. PATENT DOCUMENTS

| | | | | |
|---|---|---|---|---|
| 3,004,560 A * | 10/1961 | Knight et al. | ............... | 138/30 |
| 3,063,470 A * | 11/1962 | Forster | ............... | 138/30 |
| 3,195,577 A * | 7/1965 | Greer | ............... | 138/30 |
| 3,322,154 A * | 5/1967 | Mercier | ............... | 138/30 |
| 3,605,815 A * | 9/1971 | Forell | ............... | 138/30 |
| 4,628,964 A * | 12/1986 | Sugimura et al. | ............... | 138/30 |
| 4,732,176 A * | 3/1988 | Sugimura | ............... | 138/30 |
| 4,759,387 A * | 7/1988 | Arendt | ............... | 138/30 |
| 5,256,268 A * | 10/1993 | Goto et al. | ............... | 204/268 |
| 6,131,613 A * | 10/2000 | Jenski et al. | ............... | 138/30 |
| 2003/0226607 A1 * | 12/2003 | Young | ............... | 138/30 |

* cited by examiner

*Primary Examiner* — James Hook
(74) *Attorney, Agent, or Firm* — Jenkins, Wilson, Taylor & Hunt, P.A.

(57) ABSTRACT

The invention relates to a hydro sound damper, in particular for integration in an aircraft hydraulic system, with a throughout inner tube, wherein the inner tube comprises a perforation section which is coaxially encompassed by a housing under formation of a gas-filled cavity. The perforation section is coaxially encompassed by a metal felt cylinder at least in sections and an elastomeric membrane bears on the metal felt cylinder for generating a gas cushion, which is closed in itself. Due to the metal felt cylinder a pushing through of the elastomeric membrane into the bores of the perforation section is avoided when the hydraulic system is depressurized. Furthermore, the metal felt cylinder, which is infiltrated respectively flowed through, produces an improved damping characteristic which might moreover be adjusted by a variation of the flow resistance of the used metal felt. The hydro sound damper is built-on spacious compact, has a low weight, reaches high damping values over a broad noise spectrum and is therefore capable of being easily integrated in existing aircraft hydraulic systems.

10 Claims, 2 Drawing Sheets

HYDRO SOUND DAMPER, IN PARTICULAR FOR INTEGRATION IN AN AIRCRAFT HYDRAULIC SYSTEM

CROSS-REFERENCE TO RELATED APPLICATIONS

This application claims the benefit of U.S. Provisional Application No. 61/070,076, filed Mar. 20, 2008, the entire disclosure of which is herein incorporated by reference.

FIELD OF THE INVENTION

The present invention relates to a hydro sound damper, in particular for integration in an aircraft hydraulic system with an end-to-end inner tube, wherein the inner tube comprises a perforation section, which is coaxially encompassed by a housing for generating a gas-filled cavity.

BACKGROUND OF THE INVENTION

For controlling the aerodynamic rudders modern aircrafts use the so called "fly-by-wire"-technology. The flight commands of the pilot are transformed by steering computers into electrical and/or optical signals, which are used for piloting actuators for hydraulically controlling the aerodynamic rudders. Furthermore, other devices inside an aircraft, like the landing gear or cargo compartment doors are hydraulically actuated. For operating such hydraulic systems powerful hydraulic pumps are necessary, which generally build up a working pressure, depending on a civilian or military use, between 150 bars and 400 bars. In general the hydraulic pumps are directly powered by the engines, wherein, as a side effect, acoustic vibration in a frequency range between about 200 Hz and 3.200 Hz are emitted of the hydraulic system.

For the abatement of such vibration phenomena in the hydraulic system, which results in many cases in an awkward noise disturbance of the passengers and which furthermore may lead to leakage, hydraulic dampers are applied where the hydraulic system is separated from a gas cushion, which functions restraining because of its elastic spring action, by a rubber membrane. In a known embodiment of such a damper element a perforated hollow cylinder acts as bearing for the rubber membrane. This construction holds the considerable disadvantage that in an inactivated state of the hydraulic system, when the operating pressure is about 0 bars, the complete pressure of the gas cushion acts always on the rubber membrane and presses it at least partially into the bores of the perforated hollow cylinder. Due to this effect the durability of the rubber membrane is reduced significantly, so that a frequent exchange of the rubber membranes is necessary with those damper elements, which leads to indefensible short maintenance intervals. Therefore, despite their outstanding damping action, dampers with gas-cushioned rubber membranes are not used in aircraft hydraulic systems at present.

The currently known embodiments of those damper elements are provided with a durability which is too short and accordingly with a maintenance intensity which is too high.

SUMMARY OF THE INVENTION

According to the present invention the problem to solve is to provide a hydro sound damper which largely avoids the preceding disadvantages.

The problem is solved by a device with the features of claim 1.

Thus, because the perforated section is at least partially encompassed by a metal felt cylinder and an elastomeric membrane overlies the metal felt cylinder a high durability of the hydro sound damper of the present invention results from that, because the sensitive elastomeric membrane does not overlie directly the perforated hollow cylinder inside the hydro damper. A mechanical damage of the integrity of the elastomeric membrane, in particular due to the pressing of the elastomeric membrane into the bores of the perforated hollow cylinder, is almost impossible because the metal felt cylinder provides an almost clean and even seating.

The metal felt cylinder is composed of a variety of finest metal fibers, in particular precious metal fibers, which are felted amongst themselves and accessory sintered, so that a close network between the discrete filaments is provided and a contamination of the hydraulic fluid is impossible. Hence, the metal felt cylinder is provided with a variety of finest micro-openings and notwithstanding provides a seating for the elastomeric membrane that is mechanical sufficiently consolidated. Furthermore, the flow resistance of the metal felt can be specifically adjusted to the used hydraulic fluid by the use of different felt metals, from what an additional damping effect results. Moreover, the used metal felt produces a very constant and at the same time strong acoustic damping effect, which can specifically adjusted by the choice of metal felts with different flow resistances, about the (sound) frequency spectrum in the area between 200 Hz and 3.200 Hz, which is relevant here. A cavity within the hydro sound damper is filled with a gas, which is pressurized with a pressure between 100 bars and 200 bars, for creating a gas cushion which acts on the elastomeric membrane. Preferably, inert nitrogen or other inert gases are used as gas. Alternatively, the cavity, which forms the gas cushion might be filled with a mixture of inert and non-inert gases. The pressure of the hydraulic fluid, which is in particular a hydraulic oil, lies between 200 bars and 400 bars. The pressure of the gas cushion generally lies between 40% and 60% of the hydraulic fluid pressure. Preferably, the pressure of the gas cushion is 50% of the hydraulic fluid pressure.

Further advantageous embodiments of the hydro sound damper are explained in the further claims.

DESCRIPTION OF THE PREFERRED EMBODIMENTS

Figure 1:
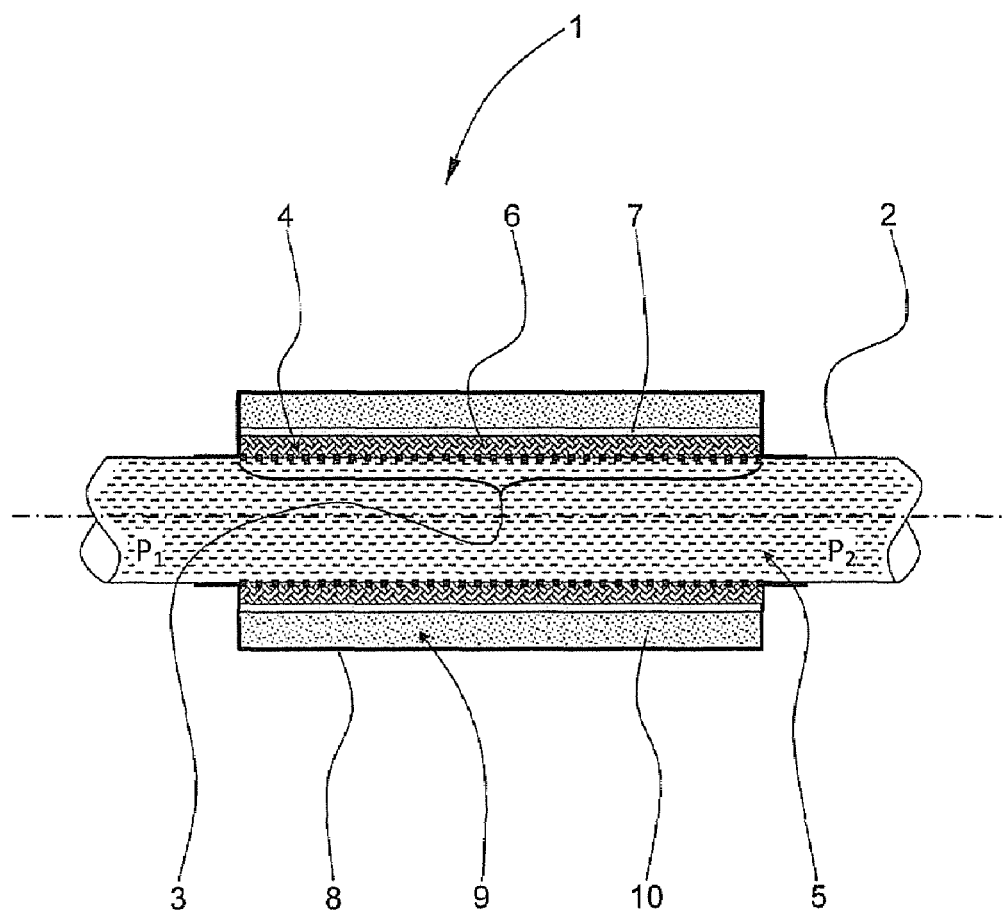
FIG. 1 a schematic longitudinal section of a hydro sound damper.

FIG. 1 shows a schematic longitudinal section of a hydro sound damper 1 of the present invention. The hydro sound damper 1 comprises amongst others a throughout inner tube 2 with a perforation section 3. In the perforation section 3 the inner tube 2 comprises a variety of bores, of which one bore 4 is provided representatively for the others with a reference sign. The bores are exclusively placed in the inner tube 2 in the area of the perforation section 3 and respectively placed to each other in a constant manner, i.e. placed in a constant grid. The bores also might be provided only in sections. Instead of the bores, longitudinal slots, a fine bore perforation or other recesses might be provided. The inner tube 2 is integrated into the pipe system of a not shown (aircraft) hydraulic system and is passed through by a hydraulic fluid 5, in particular by a hydraulic oil. The hydraulic fluid 5 and therewith the whole hydraulic system of the aircraft are pressurized with a pressure between 200 bars and 400 bars.

The inner tube 2 is completely surrounded by a metal felt cylinder 6, which is saturated with the hydraulic fluid 5, in the area of the perforation section 3. A flexible elastomeric membrane 7 closely bears on the metal felt cylinder 6. A preferably cylindrical housing 8 coaxially encloses the elastomeric membrane 7 under formation of a cylindrical cavity 9. The cavity 9 is filled with a pressurized gas, in particular with inert nitrogen, to establish an elastic springy pressure cushion 10. The cylindrical housing 8 is connected on both sides firmly and gastight and pressure-tight to the inner tube 2. The nitrogen inside the cavity 9 is preferably pressurized with a pressure between 100 bars and 200 bars. Instead of nitrogen, other gases, preferably inert gases might be used for filling the cavity 9. The elastomeric membrane 7 is characterized in that it is diffusion resistant against the gas nitrogen and that it is provided with a sufficient chemical resistance against the hydraulic fluid 5. Due to the diffusion resistance a slowly pressure drop in the cavity 9 is avoided. The elastomeric membrane 7 causes a complete separation of the hydraulic fluid 5 and the gas cushion 10. Pressure impulses that are induced into the hydraulic system from the outside are transmitted through the hydraulic fluid 5 and temporary press the elastomeric membrane 7 against the pressure of the gas cushion 10 to the outside in a radial direction. After the dying out of the pressure peak the elastomeric membrane 7 springs or shoots back in its initial position. When the hydraulic system is switched off, the pressure of the gas cushion 10 is just about 40% to 60%, however preferably 50% of the pressure the hydraulic fluid 5 and the whole hydraulic system of the aircraft, respectively, are pressurized with under use, whereby a superior damping effect in the vibration range between 200 Hz and 3.200 Hz, which is relevant for noise problems in hydraulic systems, is provided.

When engaging the hydraulic system, the elastomeric membrane 7 is lifted from the metal felt cylinder 6 so far till the whole gas cushion 10 is pressurized with the same static pressure like the hydraulic fluid 5. The elasticity of the elastomeric membrane 7 is chosen in such a way that no excessive buckling of the elastomeric membrane 7 occurs under these pressure conditions. In this state the hydro sound damper 1 forms an extremely soft "mechanical" spring and pressure pulsations of the hydraulic fluid 5 are reflected in the inner tube 2 in a very broad frequency range so that a very high sound damping action of the hydro sound damper 1 is provided.

The metal felt cylinder 6, which is tightly drawn over the inner tube 2 provides on the one hand a clean and smooth seating for the elastomeric membrane 7. On the other hand the metal felt cylinder 6 is permeable for the hydraulic fluid due to the variety of smallest openings and notwithstanding comprises a sufficient high mechanical toughness for supporting the pressurized elastomeric membrane 7. Otherwise, by an adequate choice of the metal felt, which is available with different flow resistances, it is possible to produce just as much absorption, respectively noise damping as is needed by the construction demands in the individual case.

Furthermore, a nearly holohedral support of the elastomeric membrane 7 is provided by the clean surface of the metal felt cylinder 6, so that even in the case of the depressurized hydraulic fluid 5 no pushing through of the elastomeric membrane 7 in the area of the perforation section 3 occurs. Hereby, the hydro sound damper 1 of the present invention is practically maintenance-free and reaches high operating times, which might be in the range of the life cycle of a common passenger aircraft.

Due to its coaxial buildup the hydro sound damper 1 is spacious very compact, exhibits a low mass in comparison to other buildups and dampens the occurring noise vibrations over a broad frequency spectrum, so that is almost predestined for the use in all aircrafts, in particular in passenger aircrafts, for the elimination of hydraulically generated noise problems.

Figure 2:
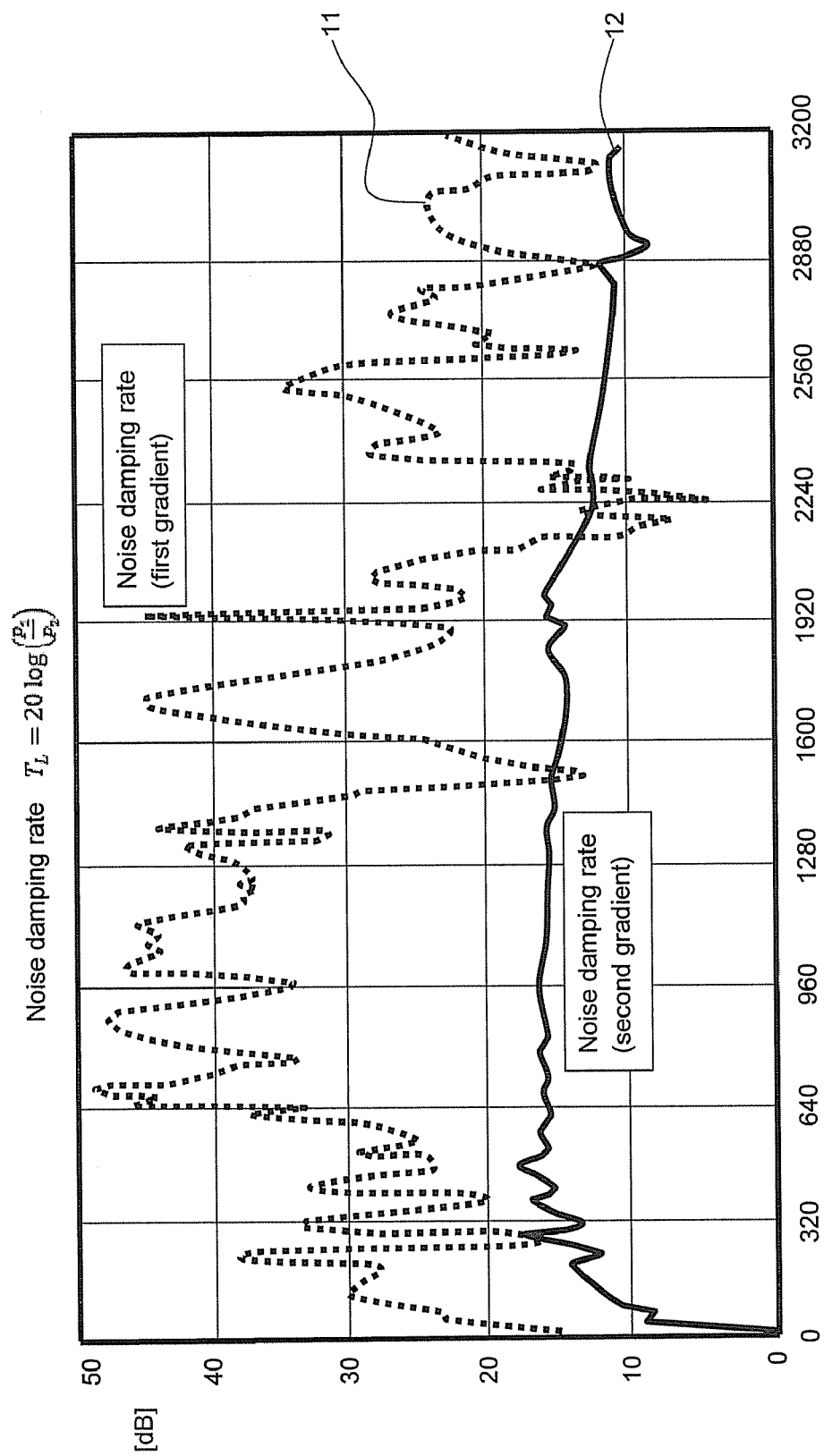
FIG. 2 a graph of two gradients, which were empirically identified with a prototype sample of the hydro sound damper of the present invention.

FIG. 2 shows a graph with two gradients 11, 12 of the noise damping rate, which were empirically determined by voluminous test series on the hydro sound damper 1 and a conventional damper element.

On the abscissa, the noise frequencies that are to be dampened are plotted in a range between about 0 Hz and 3.200 Hz and on the ordinate, the damping rate $T_L = 20 \log(P_1/P_2)$ in the interval of 0 to 50 Dezibel (dB) is plotted. Thereby $P_1$ represents the chronological pressure trend at the inlet of the hydro sound damper 1 and $P_2$ represents the pressure trend at the outlet of thereof.

The first gradient 11 shows the trend of the noise damping rate, which results from the use of a conventional damper element, whereas the second gradient 12 for comparison depicts the trend which is reached with a first prototype sample of the hydro sound damper 1 of the present invention. It is clearly visible from the graph that the hydro sound damper 1 of the present invention shows a preferably cleaner trend of noise damping over the frequency than the conventional damper element does.

The lower level of noise damping in some areas of this first prototype sample compared to the conventional damper results from the too high flow resistance of the metal felt of the first prototype sample and might be modified by the choice of other metal felts with a lower flow resistance. In principle it is valid that with a decreasing (hydraulically) flow resistance of the metal felt the noise damping effect increases.

Viewed altogether, the hydro sound damper 1 provides in comparison with already known solutions of damper elements for aircraft hydraulic systems a very effective noise damping action over a broad frequency spectrum with a high durability at the same time.

The invention claimed is:

1. A hydro sound damper with a throughout inner tube, wherein the inner tube comprises a perforation section which is coaxially encompassed by a housing under formation of a cavity, which is filled with a gas, characterized in that the perforation section is coaxially encompassed by a metal felt cylinder at least in sections, and in that an elastomeric membrane bears on the metal felt cylinder, wherein the inner tube is filled with a hydraulic fluid, which is pressurized with a pressure between approximately 200 bars and 400 bars, wherein the pressure of the gas is between approximately 40% and 60% of the pressure of the hydraulic fluid, and wherein the hydro sound damper is integrated in an aircraft hydraulic system.

2. The hydro sound damper of claim 1, wherein the gas for formatting a gas cushion is pressurized with a pressure between 100 bars and 200 bars.

3. The hydro sound damper of claim 1, wherein the gas is nitrogen or an other inert gas.

4. The hydro sound damper of claim 1, wherein the elastomeric membrane lifts itself from the metal felt cylinder till the pressure of the hydraulic fluid is approximately equal to the pressure of the gas.

5. The hydro sound damper of claim 1, wherein the metal felt cylinder is composed of a variety of finest metal filaments, which are felted amongst themselves and sintered.

6. The hydro sound damper of claim 5, wherein the metal filaments are composed of a precious metal.

7. The hydro sound damper of claim 1, wherein the perforation section is provided with a variety of recesses, which are placed to each other in a constant grid-like manner.

8. The hydro sound damper of claim 7, wherein the recesses are bores.

9. The hydro sound damper of claim 1, wherein a flow resistance of the metal felt cylinder is varied for the modification of the damping characteristic of the hydro sound damper.

10. The hydro sound damper of claim 1, wherein the hydraulic fluid is a hydraulic oil.

* * * * *